June 30, 1936.   F. E. SLOCOMBE   2,045,880
PROCESS AND APPARATUS FOR ANNEALING GLASS PLATES
Filed Sept. 20, 1934   3 Sheets-Sheet 1
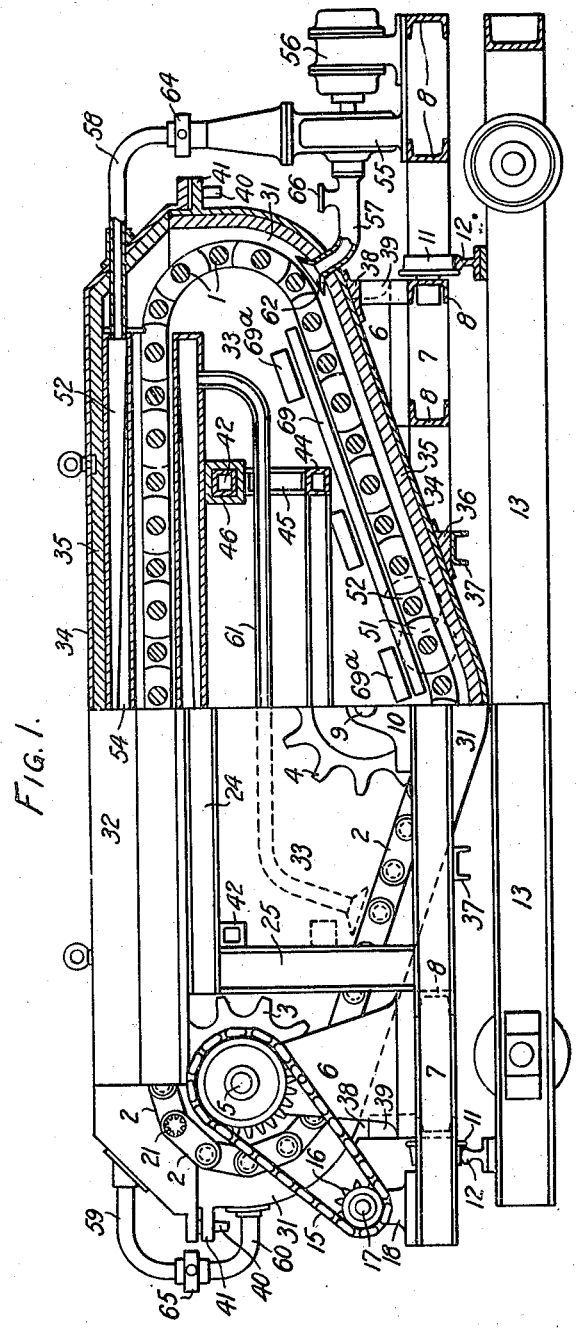
INVENTOR,
Frank Edwin Slocombe
by
Morrison, Kennedy & Campbell
Attys.

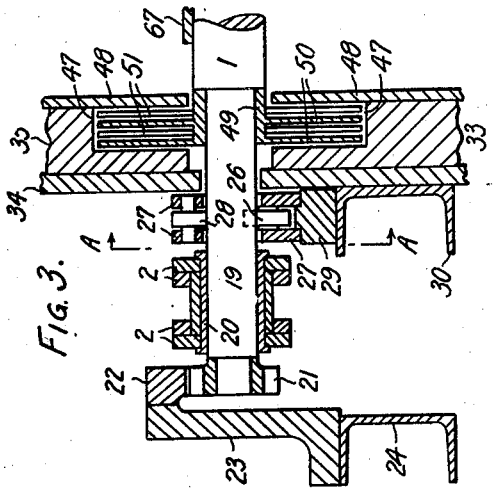
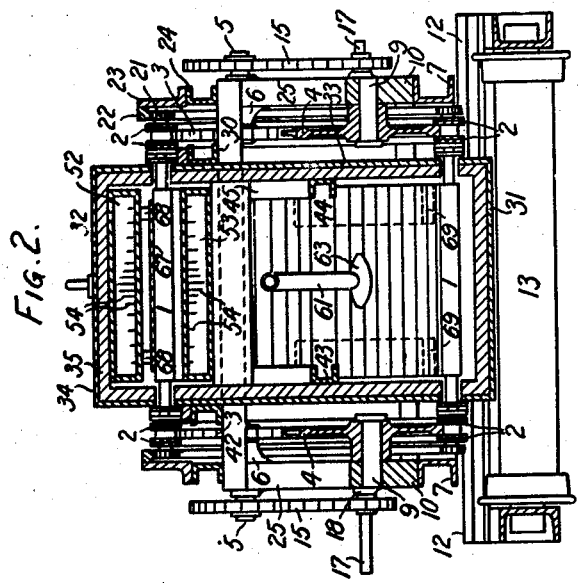

June 30, 1936.  F. E. SLOCOMBE  2,045,880
PROCESS AND APPARATUS FOR ANNEALING GLASS PLATES
Filed Sept. 20, 1934    3 Sheets-Sheet 3
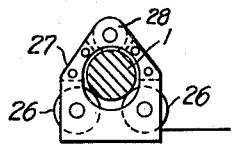
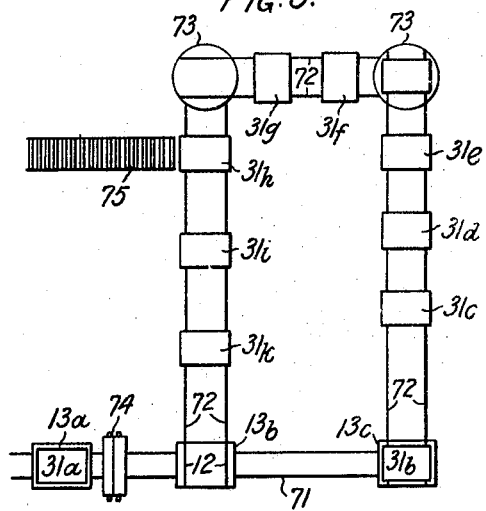
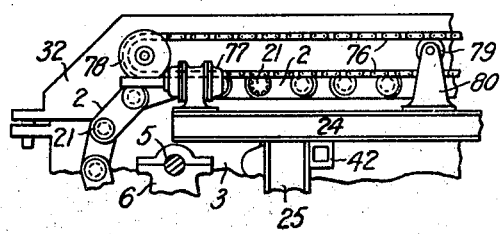

Patented June 30, 1936

2,045,880

UNITED STATES PATENT OFFICE 2,045,880

PROCESS AND APPARATUS FOR ANNEALING GLASS PLATES

Frank Edwin Slocombe, Doncaster, England, assignor to Pilkington Brothers Limited, Liverpool, England, a British company Application September 20, 1934, Serial No. 744,773
In Great Britain September 26, 1933

10 Claims. (Cl. 49—45)

This invention has for its object an improved process and apparatus for annealing glass plates.

According to the invention, a closed heat-insulating casing, adapted to contain a glass plate, is provided with means for maintaining the temperature uniform in the neighbourhood of the plate, and contains an endless series of rollers which are maintained in both travelling and rotating motion, so that the plate rests substantially stationary on them. The roller shafts are carried by a pair of endless chains outside the casing and means are provided for sealing the slots in the casing through which the roller shafts pass. A fan is employed to circulate the air in the casing and to supply thereto additional air to make up leakage through the sealing device and maintain a small pressure in the casing. Preferably, the air is circulated through boxes in the casing above and below the rollers on which the plate rests, and the boxes are provided with fins adapted to equalize the temperature in the spaces above and below the plate. Further, since the rollers cool more rapidly at their ends than at their centres, the air is drawn from and returned to the casing by mouthpieces which cause it to pass over the central portion of the rollers.

Guides are provided to support the upper flight of rollers in a horizontal plane, to form a bed for the plate, and the upper part of the casing is formed as a cover which is removable to leave the horizontal flight of rollers exposed. The apparatus is carried on a truck which is adapted to travel under a rolling machine at the speed of rolling. During the travel of the truck, the cover having been removed, a plate is received on the rollers in the casing, and the cover is then replaced. Since the time of annealing may be from 30 to 60 minutes, the apparatus, which is carried on rails on the truck, is run off the truck on to a system of rails with turntables, forming a closed circuit by which the apparatus may be brought back to the line of rails on which the truck travels and replaced on the truck. At one point of the system of rails, the apparatus is brought opposite a conveyor, and the plate, after it has reached its lower annealing temperature, is moved on to the conveyor. The apparatus is then heated up to the temperature suitable for receiving a plate. A plurality of annealing apparatuses may be employed, each in turn going through the above described process. The means for heating the apparatus is so disposed as to supply more heat to the ends of the rollers than to their central portions.

Conveyors in which the rollers both travel and rotate have been used to give a plate resting on them a resultant slow movement by which the plate is transferred on to the rollers of a tunnel lehr and they have also been used to give a resultant forward movement for receiving a plate from a rolling machine. In the present invention the rollers have no conveying function (unless it be for a brief period after annealing is complete, for removing the plate), but they are kept in continual motion for two purposes, firstly, to provide a bed in which the lines of support of the plate are continually shifting, so that a plate can remain stationary in it while soft, and secondly, while the apparatus is being heated to the temperature requisite to receive a plate, to prevent the rollers sagging when very hot, by their own weight.

Since the casing, during the annealing process, must fall in temperature at the rate desired for the annealing, and since the rollers must lose heat through their shafts which extend outside the casing, it is important that the means employed for regulating the rate of cooling and for heating up the apparatus be such as to maintain the rollers at a uniform temperature over a length equal to the width of the plate, and also to secure a uniform rate of loss of heat from all parts of the two surfaces of the plate. Preferably, surfaces are provided above and below the plate to which it can radiate heat, the temperature of the surfaces at different points being determined to secure a uniform rate of loss of heat from the plate. Alternatively, or in addition to the said surfaces, electric heaters may be so located as to supply heat to those portions of the plate which tend to cool more rapidly than others.

The advantages of the above-described apparatus and process of annealing glass plates, as compared with the customary method employing a tunnel lehr, are as follows:—

(1) The plate is enclosed and under temperature control within a very short period (of the order of ten seconds) after rolling. This is of especial importance in the case of opaque glasses in which the opacity depends on crystallization between rolling and setting.

(2) The plates are protected from dirt. This is of importance in the case of plates which are not to be ground.

(3) The rates of rolling and annealing are quite independent, and either may be altered to suit glasses of different thickness or composition, without affecting the other. Thus, the time of annealing may be increased without altering either the rate of rolling or the frequency of rolling, by increasing the number of roller conveyors serving the rolling apparatus.

(4) The heat capacity of the annealing apparatus is very small in comparison with that of a lehr. Consequently, the rate of annealing can be quickly and easily varied and, if the process be stopped and restarted, the loss of plates at the start, due to faulty temperature conditions in the lehr, is avoided.

(5) The supply of heat for annealing is small in comparison with that required for a tunnel lehr and, when no plates are being rolled, the heat supply to the annealing apparatus need not be maintained.

In the accompanying drawings:—

Figure 1 is a side view, half in section, of the apparatus, with the fan in elevation;

Figure 2 is a vertical central cross-section thereof, looking towards the left end of Figure 1;

Figure 3 is a section through one of the rollers, to a scale four times that of Figures 1 and 2, showing certain details of the casing and conveyor;

Figure 4 is a section through AA of Figure 3, showing the supporting device for the rollers;

Figure 5 is a diagrammatic plan of the system of rails and turntables for transport of the apparatus, and Figure 6 is a part view similar to the part in elevation of Figure 1, showing an alternative method of rotating the rollers.

Referring to the drawings, the rollers 1 are carried by two chains with links 2, which pass over three chain wheels on each side of the apparatus; two of these chain wheels on each side, 3, 3, are at the ends of the upper horizontal flight of the chain, and the third chain wheel 4 engages the lower flight. The shafts 5 of the chain wheels 3 run in bearing supports 6, mounted on the longitudinal girders 7, 7, one on each side of the apparatus, which are connected by cross girders 8. The chain wheels 4 run on stub axles 9 held in blocks 10 on the girders 7. The girders 7 carry wheels 11 which run on rails 12 on a truck 13.

On the shafts 5 of the two chain wheels 3 at the lefthand end of Figure 1, are mounted chain wheels 14, driven by chains 15 from chain wheels 16 on a shaft 17 mounted in bearings 18 carried by the girders 7.

The shafts 19 (Figure 3) of the rollers 1 turn in bearing bushes 20 in the chain links 2. At the outer ends of the shafts 19 are fixed gear wheels 21, having a pitch diameter equal to the diameter of the rollers 1. Along the horizontal flight of the chains, the gear wheels 21 engage a rack 22 fixed to a rail 23 carried by longitudinal girders 24, supported on the girders 7 by uprights 25. The rollers, therefore, as they are moved along the horizontal flight by the conveyor chains, are rotated by engagement of the gear wheels 21 with the racks 22, so that they roll under a glass plate 67 (shown in Figures 2 and 3, but omitted from Figure 1) resting on them, without giving the plate any movement.

During their travel along the horizontal flight, the rollers are supported in a horizontal plane by means of the device shown in Figure 4, and, in section, in Figure 3. The roller 1 rests on two disc rollers 26 rotatably mounted in two plates 27, which also carry a small disc roller 28 above. The lower edges of the two plates 27 slide on a rail 29 fixed to the girder 30, which is supported as will be described hereinafter.

The rollers 1 are enclosed in a casing, consisting of a body 31 and a cover 32 and two side-panels 33. The body, the cover and the panels consist of a metal casing 34 with a lining 35 of insulating material. The body 31 is supported on the girders 7 by blocks 36 on cross girders 37 and blocks 38 on uprights 39 resting on two of the cross girders 8. The cover rests on the body and is registered therewith by pins 40 passing through lugs 41. The side-panels are supported by two box girders 42 passing through the two panels and fixed to the uprights 25. The longitudinal girders 30 (Figures 2 and 3) are attached to the girders 42 and to the outer casing of the panels. The panels are also supported inside the casing by the longitudinal girders 43, the cross girders 44 and the uprights 45. The portion of the box girders 42 inside the casing are covered with insulating material 46 to lessen the rate of conduction of heat through them to the outside of the casing.

Referring to Figure 3, it will be seen that the cover, having reference figures 34, 35, is separated from the side panel 33 by a space through which pass the rollers 1 and their shafts 19. This space is sealed against the free passage of air by a sealing device attached to each roller and operating in a space formed by cutting away a portion at 47 of the insulating material 35, and by the metal strips 48. The sealing device consists of a bush 49 with two discs 50, these discs interleaving with the discs 51 of the next adjacent roller, on which the sealing device is similar except for the position of the discs. Two sets of discs 50 and 51 are shown with dotted lines at the lower part of the sectional half of Figure 1.

In order to provide for uniform cooling of a glass plate resting on the rollers 1 in the horizontal flight of the conveyor, the boxes 52, 53, above and below these rollers respectively, are provided with means for varying the rate of cooling of certain parts of the plate compared with other parts. Normally, the edge and end portions of the plate cool more rapidly than the central portion, and the upper side more rapidly than the lower side. The boxes 52, 53, are therefore provided with fins 54, which are deeper at the centres of the boxes than at the ends, and are deeper or at closer intervals in the central portions than in the edge portions. A fan 55, driven by a motor 56, draws air from the casing by the pipe 57 and delivers it to the box 52 by the pipe 58, entering the box at the right hand end. Pipes 59 and 60 connect the lefthand ends of the boxes 52 and 53, and a pipe 61 at the righthand end of the box 53 returns the air to the casing. Since the centres of the rollers 1 tend to have a higher temperature than the ends, the pipes 57 and 61 terminate in mouthpieces 62 and 63 respectively, so located as to draw and blow, respectively, the air past the centres of the rollers. The pipes 58 and 59 which are fixed to the cover 32, are joined to the outlet of the fan 55 and the pipe 60, respectively, by unions 64 and 65, respectively, after the cover has been put in place In order to prevent the leakage of cold air into the casing, a slight pressure is maintained in the casing by admitting a small amount of air into the suction side of the fan 55 by the pipe 66, and the air so admitted is preferably preheated. Electrical heaters 69 are supported by brackets 69a on the panels 33 for the purpose of regulating the rate of cooling and also for the purpose of bringing the apparatus up to the desired temperature before receiving a plate. The heaters 69 are so shaped and placed as to radiate on to the end portions of the rollers 1. The heaters are not visible in the section of Figure 2, but their position relative to the length of the rollers is indicated in Figure 2 by dotted lines. By this location of the heaters, the rollers 1, which cool more rapidly at their ends than at their centre, can be brought to a uniform temperature.

Since it is impossible to adjust the speeds of travel and of rotation of the rollers 1 with such accuracy that the glass plate 67 remains stationary for a long period, pairs of stops 68 are attached to the ends of the box 32, which limit any movement of the plate. In consequence of any inaccuracy, the plate 67 comes against one or other of the pairs of stops and remains in contact therewith, while there is a slight amount of slip between the plate and the rollers.

Referring to Figure 5, 71 are rails on which the truck 13 is adapted to run; 72 are rails on which the wheels 11 of the apparatus are adapted to run, the rails 72 registering with the rails 12 on the truck 13 when this is in the positions 13b and 13c. The three sections of rails 72 are connected by turntables 73. In Figure 5, the apparatus is indicated by the reference figures 31 of its casing, with attached letter to distinguish different positions of the apparatus or different apparatuses. The rolling apparatus is indicated by the rollers 74.

In operation, the cover 32 is removed and the apparatus on the truck 13 is brought into the position 31a, 13a. As soon as the rolling machine is started, the truck 13 is moved under it at the speed of rolling, so that the plate, as it is rolled, is received on the rollers 1. The travel of the truck is continued till it reaches the position 13c. The cover 32 is then put on the apparatus, the air pipes are connected by the unions 64 and 65, and the fan 55 is put in operation.

The apparatus is then run off the rails 12 on the truck on to the rails 72, to the position 31c, and the truck 13 is then moved back to the position 13b When another plate is to be rolled, another apparatus at 31k is run off the rails 72 on to the rails 12 of the truck at 13b, and the truck is moved back to the position 13a, and the operation is repeated. The rollers 1 are kept continuously in motion, both while the plate is on them and during the heating of the apparatus. Each apparatus is turned through 90° on one turntable and through 270° on the other, so that its position on the truck 13 may always be the same. Different apparatuses, each containing a plate being annealed, are indicated at 31d, 31e, 31f and 31g. When the plate in any apparatus has reached its lower annealing temperature, the apparatus is brought to a position 31h, in front of a conveyor 75. The cover 32 is removed, the plate pushed on to the conveyor 75, the cover replaced and the apparatus moved to a position 31i, where the electric heaters 69 are operated to reheat the apparatus up to the desired temperature.

Instead of rotating the rollers 1 at a speed having a fixed relationship to the speed of their travel, by means of the rack 22 engaging the gear wheels 21, the latter may be driven in such a way that their speed may be varied. Referring to Figure 6, which shows in elevation the lefthand top portion of the apparatus, but with the chain wheel 14 removed, the gear wheels 21, in the horizontal flight of the rollers, engage a chain 76, which is driven by a motor 77 and worm gear 78, the chain wheel driving the chain being behind the casing of the worm wheel. The motor 77 is supported on the girder 24, which is extended to the left. The upper flight of the chain 76 is supported at intervals by idle chain wheels 79 mounted in supports 80.

Normally, the chain 76 is driven at such a speed that the glass plate remains stationary as nearly as is practicable, but, when the apparatus is brought to position 31h (Figure 5) the speed may be increased to run the plate on to the conveyor 75. Further, the variable speed of the chain 76 may be made use of to keep the plate within certain limits on the rollers 1. For this purpose the stops 68 are made movable, so as to actuate rods passing through the casing; the two rods are connected together and actuate a switch of the motor 77. The motor speed is adjusted so that, with the resistance in circuit, it runs very slightly too slow to keep the plate stationary; the plate then travels slowly to the left until it actuates the lefthand rod which closes the short circuiting switch and so increases the motor speed, to make the plate travel slowly to the right until it reaches the rod at the other end of the apparatus, when the speed is again reduced. In this way the plate is kept travelling slowly backwards and forwards.

Instead of the two boxes 52 and 53, electric heaters may be employed to supply heat to those portions of the plate which tend to cool more rapidly, and then the fan suction and delivery mouthpieces are so placed as to circulate the air in the apparatus.

It is not essential that the apparatus should have a removable cover, since it may be provided with a door through which the plate may be inserted on to the horizontal flight of rollers, but, in this case, the plate from the rolling machine must be received on a roller bed to the end of which the apparatus is brought, so that the plate may be transferred from the roller bed into the apparatus.

Having described my invention, I declare that what I claim and desire to secure by Letters Patent is:—

1. Apparatus for annealing glass plates comprising a casing adapted to receive a glass plate, means whereby the temperature of the air in the casing is caused to fall at the rate adapted for annealing, an endless series of rollers in the casing having an upper horizontal flight adapted to support the plate, means for travelling the rollers and means for rotating them at a speed to keep the plate substantially stationary.

2. Apparatus for annealing glass plates comprising a casing adapted to receive a glass plate, means whereby the temperature of air in the casing is caused to fall at the rate adapted for annealing, an endless series of rollers in the casing having an upper horizontal flight adapted to support the plate, a pair of endless chains outside the casing adapted to carry the roller shafts, means for driving the chains and means for rotating the rollers at a speed to keep the plate substantially stationary.

3. Apparatus for annealing glass plates comprising a casing adapted to receive a glass plate, means whereby the temperature of the air in the casing is caused to fall at the rate adapted for annealing, an endless series of rollers in the casing having an upper horizontal flight adapted to support the plate, a pair of endless chains outside the casing adapted to carry the roller shafts, means for driving the chains, means for sealing the slots in the casing through which the roller shafts pass and means for rotating the rollers at a speed to keep the plate substantially stationary.

4. Apparatus for annealing glass plates comprising a casing adapted to receive a glass plate, means whereby the temperature of the air in the casing is caused to fall at the rate adapted for annealing, means for circulating the air in the casing, an endless series of rollers in the casing having an upper horizontal flight adapted to support the plate, means for travelling the rollers and means for rotating them at a speed to keep the plate substantially stationary.

5. Apparatus for annealing glass plates comprising a casing adapted to receive a glass plate, means whereby the temperature of the air in the casing is caused to fall at the rate adapted for annealing, an endless series of rollers in the casing having an upper horizontal flight adapted to support the plate, means for diminishing the rate of loss of heat of the ends of the rollers relative to that of the centres of the rollers, means for travelling the rollers and means for rotating them at a speed to keep the plate substantially stationary.

6. Apparatus for annealing glass plates comprising a casing adapted to receive a glass plate, means whereby the temperature of the air in the casing is caused to fall at the rate adapted for annealing, an endless series of rollers in the casing having an upper horizontal flight adapted to support the plate, means for traveling the rollers, means for rotating them at a speed to keep the plate substantially stationary, and means for maintaining the temperature uniform comprising means for circulating the air in the casing past surfaces above and below the rollers which are adapted to give up more heat to the air in some parts thereof than in others.

7. Apparatus for annealing glass plates comprising a casing adapted to receive a glass plate, means whereby the temperature of the air in the casing is caused to fall at the rate adapted for annealing, an endless series of rollers in the casing having an upper horizontal flight adapted to support the plate, means for travelling the rollers, means for rotating them at a speed to keep the plate substantially stationary, and means for maintaining the temperature uniform comprising means for circulating the air in the casing and electrical heaters in the casing so located as to heat the ends of the rollers more than their central portions.

8. Apparatus for annealing glass plates comprising a casing adapted to receive a glass plate, means whereby the temperature of the air in the casing is caused to fall at the rate adapted for annealing, means for circulating the air in the casing, means for supplying additional air to the casing to maintain a slight pressure therein, an endless series of rollers in the casing having an upper horizontal flight adapted to support the plate, means for travelling the rollers and means for rotating them at a speed to keep the plate substantially stationary.

9. Apparatus for annealing glass plates comprising a casing adapted to receive a glass plate, means whereby the temperature of the air in the casing is caused to fall at the rate adapted for annealing, an endless series of rollers in the casing having an upper horizontal flight adapted to support the plate, means for travelling the rollers, means for rotating them at a speed to keep the plate substantially stationary, a truck adapted to carry the apparatus and means for driving the truck at the speed of rolling a plate.

10. Process of annealing a glass plate comprising introducing a plate into a casing, keeping the plate substantially stationary therein, continuously shifting the lines of support of the plate, and regulating the rate of fall of temperature of the air in the casing.

FRANK EDWIN SLOCOMBE.